(12) United States Patent
Lipscomb et al.

(10) Patent No.: US 7,108,292 B2
(45) Date of Patent: Sep. 19, 2006

(54) HOSE COUPLER

(75) Inventors: Daniel J. Lipscomb, Prairie du Sac, WI (US); Alexander P. Kobryn, Sauk City, WI (US); Lorena E. Yin, Madison, WI (US)

(73) Assignee: Fiskars Brands, Inc., Madison, WI (US)

( * ) Notice: Subject to any disclaimer, the term of this patent is extended or adjusted under 35 U.S.C. 154(b) by 160 days.

(21) Appl. No.: 10/812,119

(22) Filed: Mar. 29, 2004

(65) Prior Publication Data

US 2004/0201213 A1    Oct. 14, 2004

Related U.S. Application Data

(60) Provisional application No. 60/461,597, filed on Apr. 8, 2003.

(51) Int. Cl.
*F16L 27/00*    (2006.01)
*F16L 33/00*    (2006.01)

(52) U.S. Cl. .............. 285/272; 285/275; 285/278; 285/281; 285/242; 285/256; 285/258; 285/259

(58) Field of Classification Search .......... 285/242, 285/251, 256, 258, 259, 272, 275, 278, 281
See application file for complete search history.

(56) References Cited

U.S. PATENT DOCUMENTS

| 175,232 | A | 3/1876 | Gilmore |
| 379,749 | A | 3/1888 | Wilson |
| 393,139 | A | 11/1888 | Bodycomb |
| 599,224 | A | 2/1898 | Decarie |
| 681,067 | A | 8/1901 | Morrissey |
| 724,129 | A * | 3/1903 | Schrader ............ 285/256 |
| 793,209 | A | 6/1905 | Miller |
| 994,815 | A | 6/1911 | Booth |
| 1,001,842 | A | 8/1911 | Greenfield |
| 1,083,742 | A | 1/1914 | Hutchinson |
| 1,096,436 | A | 5/1914 | Leyner |
| 1,157,715 | A | 10/1915 | Osborne |
| 1,299,371 | A | 4/1919 | Meloon |

(Continued)

FOREIGN PATENT DOCUMENTS

DE    42 16 168 C1    10/1993

(Continued)

OTHER PUBLICATIONS

European Search Report; Application No. EP 04 00 8477; date of completion of search Jun. 24, 2004.

*Primary Examiner*—James M. Hewitt
(74) *Attorney, Agent, or Firm*—Foley & Lardner LLP

(57) ABSTRACT

An apparatus for coupling ends of a first hose and a second hose. The apparatus comprises a male coupler configured to attach to the first hose, and a female coupler having an inner cavity and being configured to attach to the second hose in the inner cavity by way of a first ferrule assembly. The first ferrule assembly comprises an outer ferrule positionable on an outside surface of the second hose proximate a first end of the second hose, and an inner ferrule positionable on an inside surface of the second hose and configured to rotatably couple with the female coupler so that the inner ferrule may swivel relative to the female coupler thereby enabling the female coupler to be swiveled about the second hose without rotating the second hose. The male coupler and the female coupler are configured to couple to each other.

26 Claims, 2 Drawing Sheets

U.S. PATENT DOCUMENTS

| | | | |
|---|---|---|---|
| 1,610,165 A | 12/1926 | Schellin | |
| 1,666,802 A | 4/1928 | von Allmen | |
| 1,845,922 A | 2/1932 | Marchus | |
| RE18,440 E * | 4/1932 | Eastman | 408/26 |
| 1,889,980 A | 12/1932 | Farley | |
| 1,911,423 A | 5/1933 | Biller | |
| 2,109,522 A * | 3/1938 | Boyle | 285/379 |
| 2,172,650 A | 9/1939 | Couty | |
| 2,216,839 A | 10/1940 | Hoffman | |
| 2,228,018 A | 1/1941 | Scholtes | |
| 2,294,698 A | 9/1942 | Strout | |
| 2,339,746 A | 1/1944 | Marchus | |
| 2,433,425 A | 12/1947 | Burckle | |
| 2,532,669 A | 12/1950 | Jones | |
| 2,543,087 A | 2/1951 | Woodling | |
| 2,543,088 A | 2/1951 | Woodling | |
| 2,570,406 A | 10/1951 | Troshkin et al. | |
| 2,574,625 A | 11/1951 | Coss | |
| 2,631,047 A * | 3/1953 | Spender et al. | 285/148.15 |
| 2,632,659 A | 3/1953 | Lee, II | |
| 2,702,200 A | 2/1955 | Fukuyama | |
| 2,705,651 A | 4/1955 | Myers | |
| 2,825,588 A | 3/1958 | Howard | |
| 2,833,568 A | 5/1958 | Corsette | |
| 2,902,299 A * | 9/1959 | Turner | 285/258 |
| 2,908,512 A * | 10/1959 | Morrow | 285/12 |
| 2,924,009 A * | 2/1960 | Mazeika | 29/507 |
| 3,017,203 A * | 1/1962 | MacLeod | 285/256 |
| 3,219,086 A | 11/1965 | Zahodiakin | |
| 3,220,753 A * | 11/1965 | Kasidas | 285/148.15 |
| 3,367,681 A | 2/1968 | Braukman | |
| 3,549,180 A * | 12/1970 | MacWilliam | 285/256 |
| 3,729,040 A | 4/1973 | Whiteside et al. | |
| D237,552 S | 11/1975 | Willmott et al. | |
| 3,999,781 A | 12/1976 | Todd | |
| 4,042,262 A | 8/1977 | Mooney et al. | |
| 4,068,867 A | 1/1978 | Rodgers et al. | |
| 4,128,264 A | 12/1978 | Oldford | |
| D262,133 S | 12/1981 | Fain | |
| 4,660,868 A | 4/1987 | Totani | |
| 4,671,542 A | 6/1987 | Juchnowski | |
| 4,893,848 A | 1/1990 | Melcher | |
| 5,314,210 A | 5/1994 | Calmettes et al. | |
| 5,367,925 A | 11/1994 | Gasparre | |
| 5,394,572 A | 3/1995 | Humphreys | |
| 5,478,122 A | 12/1995 | Seabra | |
| 5,549,432 A | 8/1996 | Reneau | |
| 5,626,369 A | 5/1997 | Shifman et al. | |
| 5,890,748 A | 4/1999 | Phillips et al. | |
| 6,027,097 A | 2/2000 | Humphreys | |
| D439,636 S | 3/2001 | Hamilton | |
| D439,663 S | 3/2001 | Guala | |
| 6,206,437 B1 | 3/2001 | Humphreys | |
| 6,217,082 B1 | 4/2001 | Orcutt et al. | |
| 6,227,579 B1 | 5/2001 | Humphreys | |
| 6,485,064 B1 | 11/2002 | Davidson | |
| 2003/0038478 A1 | 2/2003 | Humphreys | |

FOREIGN PATENT DOCUMENTS

| | | |
|---|---|---|
| EP | 0 310 234 A2 | 4/1989 |

* cited by examiner

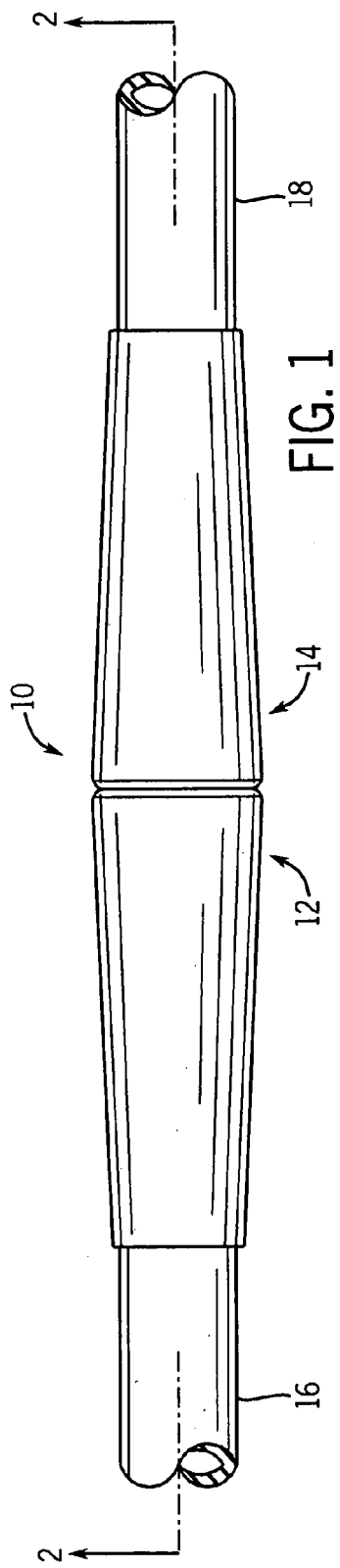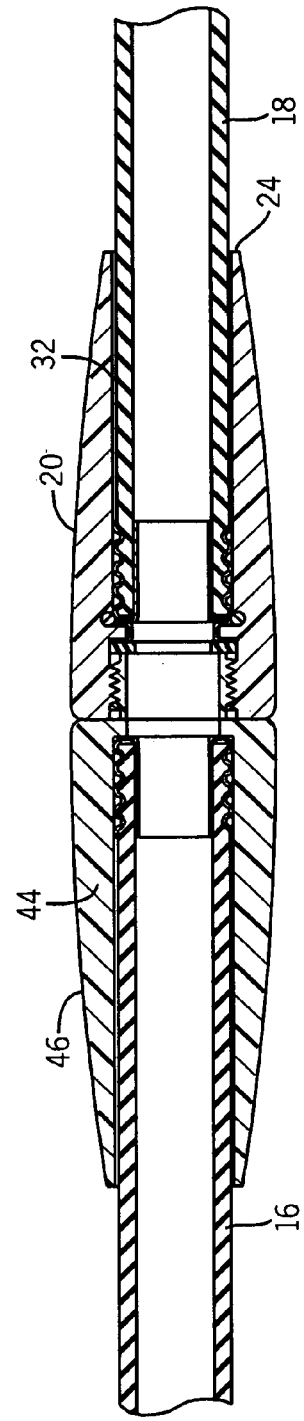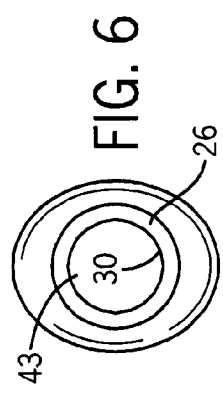

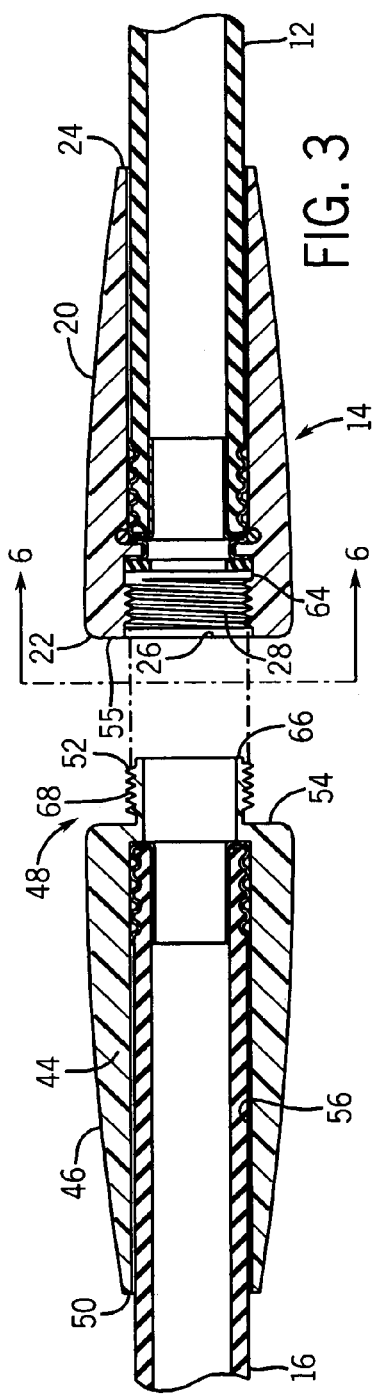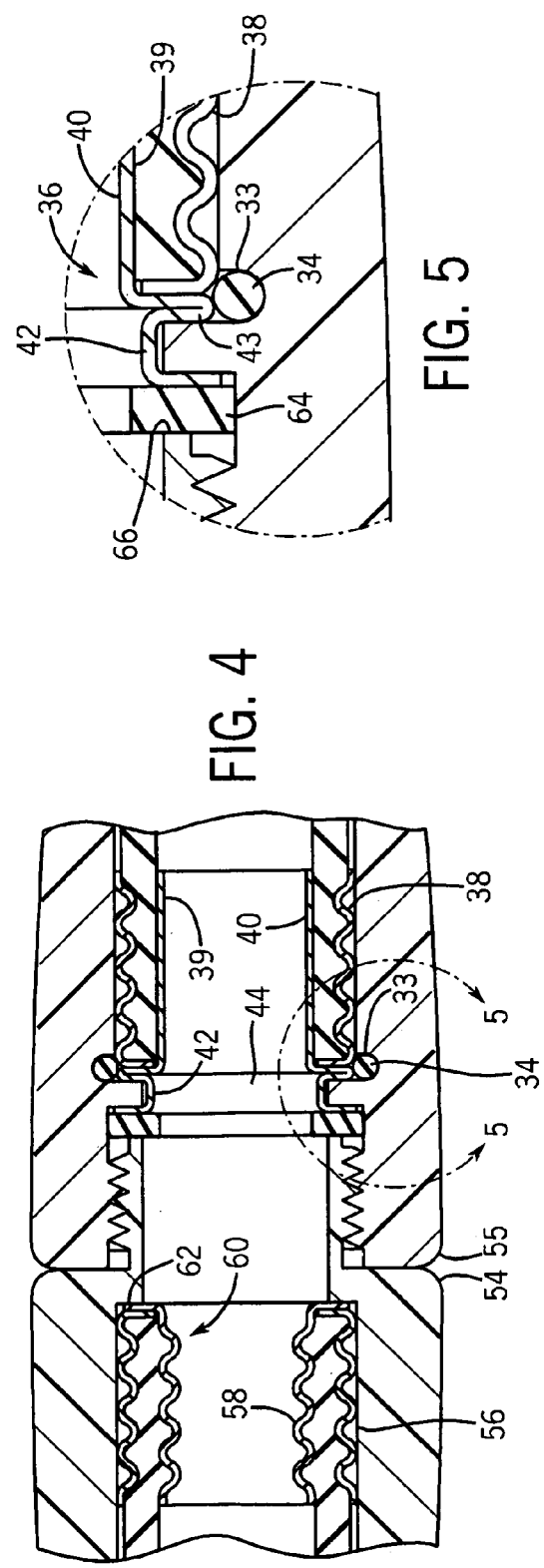

HOSE COUPLER

CROSS-REFERENCE TO RELATED PATENT APPLICATIONS

The present application claims the benefit of and priority as available under 35 U.S.C. §§ 119–21 to the following U.S. patent applications (which are incorporated by reference in the present Application): U.S. Provisional Patent Application No. 60/461,597 titled "HOSE COUPLER" filed Apr. 8, 2003; U.S. Design Patent Application No. 29/179,270 titled "HOSE COUPLER" filed Apr. 8, 2003.

BACKGROUND

The present invention relates generally to the field of hose couplers. More specifically, the invention relates to an easily gripped swiveling hose coupler.

It is generally known to provide female hose couplers that are configured to operate with the male ends of garden hoses. However, many traditional female hose couplers do not rotate independent of the hose. When tightening this type of traditional female hose coupler on to a male coupler, the hose portion attached to the female hose coupler also rotates. This rotation of the hose often results in the hose deforming, kinking, or prohibiting a tight seal between the female hose coupler and the male portion.

Attempts to solve this problem include a hose connector that allows the female coupler to swivel independently of the hose. For example, it is known to provide a female hose connector having internal threads and an elongated swivel nipple. The swivel nipple often includes a plurality of annular protrusions, and the hose connector typically includes an outer surface having an eight sided standard nut shaped configuration. However, the standard nut shaped configuration requires tools such as a wrench to fully tighten the coupler onto a male coupler. In addition, the hose must be attached to the annular protrusions with sufficient force to fully seat a hose such that it does not leak.

Accordingly, It would be desirable to provide a coupler that swivels and can be easily coupled to a male member without tools. Additionally, it would be desirable to provide a coupler that is fully secured to the hose with a traditional ferrule.

It would be advantageous to provide a coupler or the like of a type disclosed in the present application that provides any one or more of these or other advantageous features. The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the claims which follow.

SUMMARY

One embodiment of the invention relates to an apparatus for coupling ends of a first hose and a second hose. The apparatus comprises an apparatus for coupling ends of a first hose and a second hose comprising a male coupler configured to attach to the first hose, and a female coupler having an inner cavity and being configured to attach to the second hose in the inner cavity by way of a first ferrule assembly. The first ferrule assembly comprises an outer ferrule positionable on an outside surface of the second hose proximate a first end of the second hose, and an inner ferrule positionable on an inside surface of the second hose and configured to rotatably couple with the female coupler so that the inner ferrule may swivel relative to the female coupler thereby enabling the female coupler to be swiveled about the second hose without rotating the second hose. The male coupler and the female coupler are configured to couple to each other.

Another embodiment of the invention relates to an apparatus for coupling a first hose to a second hose comprising a male coupler configured to attach to the first hose, and a female coupler having an inner cavity and being configured to attach to the second hose in the inner cavity by way of a first ferrule assembly. The first ferrule assembly comprises an outer ferrule positionable on an outside surface of the second hose proximate a first end of the second hose, and an inner ferrule positionable on an inside surface of the second hose and configured to rotatably couple with the female coupler so that the inner ferrule may swivel relative to the female coupler thereby enabling the female coupler to be swiveled about the second hose without rotating the second hose. The apparatus comprises an o-ring, wherein the inner cavity of the female coupler is configured to receive the o-ring to provide a seal between the outer ferrule, the inner ferrule, and the inner cavity of the female coupler. The male coupler and female coupler are configured to couple to each other.

Another embodiment of the invention relates to a method of producing an apparatus for coupling ends of a first hose and a second hose together. The method comprises providing a male coupler configured to attach to the first hose, providing a female coupler having an inner cavity and being configured to attach to the second hose in the inner cavity by way of a first ferrule assembly, and configuring the male coupler and the female coupler to couple to each other. The first ferrule assembly comprises an outer ferrule positionable on an outside surface of the second hose proximate a first end of the second hose, and an inner ferrule positionable on an inside surface of the second hose and configured to rotatably couple with the female coupler so that the inner ferrule may swivel relative to the female coupler thereby enabling the female coupler to be swiveled about the second hose without rotating the second hose.

BRIEF DESCRIPTION OF THE DRAWINGS

FIG. 1 is a side view of a male and female hose couplers coupled together.

FIG. 2 is a cross-sectional view of the male and female couplers of FIG. 1 taken generally along lines 2—2 of FIG. 1.

FIG. 3 is an exploded view of the male and female couplers of FIG. 2.

FIG. 4 is detailed close up view of the male and female couplers of FIG. 2.

FIG. 5 is a detailed view of the O-ring seal on the female coupler taken generally along lines 5—5 of FIG. 2.

FIG. 6 is a cross-sectional view of the female coupler.

DETAILED DESCRIPTION

Before explaining a number of preferred, exemplary, and alternative embodiments of the invention in detail, it is to be understood that the invention is not limited to the details or methodology set forth in the following description or illustrated in the drawings. The invention is capable of other embodiments or being practiced or carried out in various ways. It is also to be understood that the phraseology and terminology employed herein is for the purpose of description and should not be regarded as limiting.

Referring to the FIGURES, a coupler system 10 includes a male coupler 12 and a female coupler 14 both attached to a respective first and second hose 16, 18. Female coupler 14 includes a housing 20 defining an oval shaped cone handle having a first end 22 and a second end 24. The first end 22 includes a cavity 26 having internal threads 28 and terminating with an inwardly extending ridge 30. Female coupler 14 further includes an inner region 32 of housing 20 having an annular groove 33 for receiving an O-ring 34.

As shown in FIGS. 2 through 6, hose 18 is attached to female coupler 14 with a ferrule assembly 36. An outer ferrule 38 is located on the outside surface of hose 18 proximate a first end of hose 18. An inner ferrule 40 is located on the inside of hose 18 and includes a bearing portion 42 that extends upward through opening 44 located in the base of cavity 26 and is folded and/or crimped over ridge 30. Bearing portion 42 is folded over ridge 30 in such a manner to allow inner ferrule 40 to swivel within female coupler 14 about ridge 30. A transition portion 43 may be folded onto itself and over a top portion of outer ferrule 38 to enhance the seal between the hose 18 and the inner region or surface 32 of housing 20.

Alternatively, outer ferrule 38 may include a bearing portion that is folded over ridge 30 to form the bearing surface about which the hose is allowed to swivel and/or rotate relative to female coupler 14.

An O-ring 34 is located in groove 33 to provide a seal between outer ferrule 38, inner ferrule 40, and the inner cavity 32 of female coupler 14. O-ring 34 still allows the hose 18 and outer and inner ferrules 38, 40 to swivel about ledge 30 while maintaining a seal between the hose and the coupler.

As shown in FIGS. 2, 3 and 4, male coupler 12 has a body portion or housing 44 having the same oval shaped cone as the housing 20 of female coupler 14. The exterior surface 46 of housing 44 has a first end 48 and a second open end 50. Extending from first end 48 is an external threaded portion 52 that is threadably received within the internal threads 28 of female coupler 14. The first end 48 includes an inwardly extending ridge or top surface 54 that extends from the sides of housing 44. A free end of hose 16 is secured within housing 44 proximate top surface 54 with an outer and inner ferrule portion 56, 58.

The inner cavity of housing 44 includes an inwardly extending draft such that the cross sectional area of the opening proximate second end 50 is greater than the cross sectional area of the inner cavity of housing 44 proximate the first end 48. Similarly, the inner cavity 32 of female coupler 14 also has an inwardly extending draft such that the cross sectional area of the opening proximate second end 24 is greater than the cross sectional area of the opening proximate the first end 22. This draft allows the part to be removed from a mold if it is formed from plastic. As discussed below the draft aids in the assembly and retention of the hose and ferrule assemblies within the couplers.

Attachment of hose 18 to female coupler 14 will now be discussed. Outer ferrule 38 is preferably first placed within cavity 32 through the opening proximate second end 24 and pushed upward toward first end 22. The hose 18 is then pushed upward toward and within outer ferrule 38. Alternatively, the outer ferrule may be placed on hose 18 and then both the hose 18 and outer ferrule are placed within cavity 23 together. Inner ferrule 40 is placed within the interior of hose 18 and then crimped with a tool to secure the inner ferrule 40 to hose 18. Inner ferrule 38 includes a first portion 39 that has a smooth cylindrical shape. The first portion 39 of the inner ferrule 40 is pressed within the hose 18 as is commonly known in the art to form undulations similar to those on outer ferrule 38. The O-ring 34 is placed within groove 33 prior to the assembly of the ferrules. The O-ring provides a leak proof seal between the hose and female coupler 14 even as the hose rotates relative to the female coupler. O-ring 34 may be located further away from ledge 30, or the hose may be placed further away from ledge 30 such that only one of ferrules 38 and 40 contacts the O-ring.

Turning now to the assembly of the male coupler 12, hose 16 is preferably secured to male coupler 12 with a ferrule assembly 60. As noted above, the outer ferrule 56 has undulations, and the inner ferrule 58 initially does not have undulations, however when the inner ferrule 58 is expanded within the interior of the hose the inner ferrule 58 forms undulations that are similar to the undulations of the outer ferrule 56. Inner ferrule 58 is shown with undulations in FIG. 4 while in FIGS. 2 and 3 the inner ferrule 58 is shown prior to being expanded. Similarly, inner ferrule 40 is also shown prior to being expanded. Unlike hose 18 and ferrule assembly 36 that swivels within female coupler 14, hose 16 and ferrule assembly 60 does not swivel with respect to male coupler 12. The outer ferule 56 is first press fit into the cavity of housing 44. As noted above, the cross sectional area of the housing cavity proximate first end 48 is less than the cross sectional area of the cavity of housing cavity 44 proximate second end 50. Outer ferrule 56 is press fit into the cavity of housing 44 proximate first end 48 adjacent ledge 62. A free end of hose 16 is then placed in the cavity of housing 44 such that the free end of hose 16 is adjacent outer ferrule 56. An inner ferrule 58 is then placed within the inner portion of hose 16 through the top opening in neck 68. The inner portion is then pressed outward as is known in the art to form undulations that positively capture the hose. The outer ferrule 56 protects the plastic housing 44 from breaking as the inner ferrule is pressed into hose 16. The ferrule assembly may be further secured to housing 44 by sonically welding the ferrules to housing 44. The outer ferrule 56 may be sonically welded to the housing prior to the hose 16 being inserted into housing 44. According to alternative embodiments, any suitable method of attachment of hoses 16 and 18 may be utilized. According to an exemplary embodiment, female coupler 14 and male coupler 12 may be coupled to a single hose by coupling the male coupler 12 and the female coupler 14 to opposite ends of the hose. This configuration enables multiple hoses to be coupled to one another in senes.

The oval cross sectional shape of male and female couplers 12, 14 provide an ergonomic grip to the couplers to allow the male coupler to be tightened to the female coupler without tools. In a preferred embodiment, the oval has a first dimension of approximately 1.6 in. and a second dimension of 1.325 in. In one embodiment, the length of the male and female couplers is between 3–5 inches and in a preferred embodiment is 3¾ inches. The length of the couplers 12 and 14 allow a user to fully grasp the couplers to secure one to the other without tools.

The male and female couplers 12, 14 are attached to one another by securely holding housing 44 of the male coupler 12 and rotating the female coupler onto the threads 52 of the male coupler 12. Since the housing of the female coupler can rotate relative to hose 18, the hoses do not kink or twist. A gasket or washer seal 64 is located on ledge 30 and provides a sealing surface between a top edge 66 of neck portion 68 of male coupler 12 and ledge 30 of female coupler 14. By design, the top edges 55, 54 of the female and male coupler do not contact before the top edge 66 forms a sufficient seal with seal 64.

According to various exemplary embodiments, the assemblies and components of the system may be constructed from extruded or injection molded plastic. A variety of plastics may be used for construction or assembly. For example, the hose coupler 10 may be constructed or assembled from high-impact plastics, polymers, etc. Using plastic offers several advantages including that the pieces may be constructed in a variety of different colors, surface finishes, textures, opacity, etc. According to various alternative embodiments, a variety of other known or suitable materials may be used, including metals, alloys, composites, etc. Various parts of the hose coupler 10 may be constructed and assembled as a single integrally formed piece or may be constructed and assembled from multiple parts.

It is important to note that the construction and arrangement of the elements of the hose coupler as shown in the preferred and other exemplary embodiments is illustrative only. Although only a few embodiments of the present inventions have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, colors, orientations, etc.) without materially departing from the novel teachings and advantages of the subject matter disclosed in this application. For example, the shape of the outer surface of the male and female couplers 12, 14 are oval in the preferred embodiment, however, other shapes may be employed. For example, one or more of the couplers could have finger recesses to more comfortably fit a user's hand. The shape could be round, square, triangular or any other shape or configuration that would provide an ergonomic and or mechanical advantage. Additionally, the preferred embodiment includes both a male and female adapter. However, either male or female coupler could be used with a standard female or male connector respectively. Accordingly, all such modifications are intended to be included within the scope of the present invention. The order or sequence of any process or method steps may be varied or re-sequenced according to alternative embodiments. In any claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions.

What is claimed is:

1. An apparatus for coupling ends of a first hose and a second hose, comprising:
   a male coupler configured to attach to the first hose;
   a female coupler having an inner cavity and being configured to attach to the second hose in the inner cavity by way of a first ferrule assembly disposed entirely within the inner cavity, the first ferrule assembly comprising:
      an outer ferrule positionable on an outside surface of the second hose proximate a first end of the second hose;
      an inner ferrule positionable on an inside surface of the second hose and configured to rotatably couple with the female coupler so that the inner ferrule may swivel relative to the female coupler thereby enabling the female coupler to be swiveled about the second hose without-rotating the second hose;
   wherein the male coupler and the female coupler are configured to couple to each other, and wherein the inner ferrule is coupled to the female coupler by folding a portion of the inner ferrule over a ridge located in the inner cavity of the female coupler in a manner that allows the inner ferrule to swivel within the female coupler about the ridge.

2. The apparatus of claim 1, further comprising an o-ring located in a groove of the inner cavity of the female coupler to provide a seal between the outer ferrule, the inner ferrule, and the inner cavity of the female coupler.

3. The apparatus of claim 1, wherein the male coupler comprises an external threaded portion configured to be threadably received within internal threads of the female coupler.

4. The apparatus of claim 3, wherein the male coupler has an inner cavity and is configured to attach to the first hose in the inner cavity by way of a second ferrule assembly, the second ferrule assembly comprising:
   an outer ferrule positionable on an outside surface of the first hose proximate a first end of the first hose;
   an inner ferrule positionable on an inside surface of the first hose and configured to couple with the outer ferrule proximate the first end of the first hose.

5. The apparatus of claim 4, wherein the outer ferrule of the male coupler comprises undulations to couple the outer ferrule of the male coupler to the first hose.

6. The apparatus of claim 5, wherein the inner ferrule of the male coupler comprises undulations to couple the inner ferrule of the male coupler to the first hose.

7. The apparatus of claim 6, wherein the second ferrule assembly does not swivel with respect to the male coupler.

8. The apparatus of claim 1, wherein the outer ferrule of the female coupler comprises undulations to couple the outer ferrule of the female coupler to the second hose.

9. The apparatus of claim 1, wherein the female coupler comprises an oval shaped housing.

10. The apparatus of claim 9, wherein the oval shaped housing comprises an oval shaped cone.

11. The apparatus of claim 10, wherein the housing of the female coupler has a length greater than a cross-sectional width dimension of the housing.

12. The apparatus of claim 1, wherein the male coupler comprises an oval shaped housing.

13. The apparatus of claim 12, wherein the oval shaped housing comprises an oval shaped cone.

14. The apparatus of claim 1, wherein the inner cavity of the female coupler comprises an inwardly extending draft.

15. The apparatus of claim 1, the male coupler and the female coupler each comprises an oval cross sectional shape to allow the male coupler to be tightened to the female connector without tools.

16. The apparatus of claim 1, wherein the male coupler and the female coupler are made from plastic.

17. The apparatus of claim 1, wherein the male coupler and the female coupler are made from metal.

18. An apparatus for coupling a first hose to a second hose, comprising:
   a male coupler configured to attach to the first hose;
   a female coupler having an inner cavity and being configured to attach to the second hose in the inner cavity by way of a first ferrule assembly disposed entirely within the inner cavity, the first ferrule assembly comprising:

an outer ferrule positionable on an outside surface of the second hose proximate a first end of the second hose;

an inner ferrule positionable on an inside surface of the second hose and configured to rotatably couple with the female coupler so that the inner ferrule may swivel relative to the female coupler thereby enabling the female coupler to be swiveled about the second hose without rotating the second hose; and an o-ring, wherein the inner cavity of the female coupler is configured to receive the o-ring to provide a seal between the outer ferrule, the inner ferrule, and the inner cavity of the female coupler;

wherein the male coupler and female coupler are configured to couple to each other.

19. The apparatus of claim 18, wherein the o-ring is positioned in a groove of the inner cavity of the female coupler to provide a seal between the outer ferrule, the inner ferrule;and the inner cavity of the female coupler.

20. The apparatus of claim 19, wherein the inner ferrule is coupled to the female coupler by crimping a portion of the inner ferrule over a ridge located in the inner cavity of the female coupler such that the inner ferrule may swivel within the female coupler about the ridge.

21. The apparatus of claim 20, wherein the male coupler and the female coupler may be coupled to each other by threading an external threaded portion of the male portion into internal threads of the female coupler.

22. The apparatus of claim 21, wherein the male coupler has an inner cavity and is configured to attach to the first hose in the inner cavity by way of a second ferrule assembly, the second ferrule assembly comprising:

an outer ferrule positionable on an outside surface of the first hose proximate a first end of the first hose;

an inner ferrule positionable on an inside surface of the first hose and configured to couple with the outer ferrule proximate the first end of the first hose.

wherein the outer ferrule of the male coupler comprises undulations to couple the outer ferrule of the male coupler to the first hose;

wherein the inner ferrule of the male coupler comprises undulations to couple the inner ferrule of the male coupler to the first hose.

23. The apparatus of claim 22, wherein the second ferrule assembly does not swivel with respect to the male coupler.

24. The apparatus of claim 23, wherein the female coupler and the male coupler comprise generally oval shapes for an ergonomic grip.

25. A method of producing an apparatus for coupling ends of a first hose and a second hose together, comprising:

providing a male coupler configured to attach to the first hose;

providing a female coupler having an inner cavity and being configured to attach to the second hose in the inner cavity by way of a first ferrule assembly disposed entirely within the inner cavity;

configuring the male coupler and the female coupler to couple to each other;

providing the first ferrule assembly with an outer ferrule positionable on an outside surface of the second hose proximate a first end of the second hose, and an inner ferrule positionable on an inside surface of the second hose and configured to rotatably couple with the female coupler so that the inner ferrule may swivel relative to the female coupler thereby enabling the female coupler to be swiveled about the second hose without rotating the second hose coupling the inner ferrule to the female coupler by folding a portion of the inner ferrule over a ridge located in the inner cavity of the female coupler in a manner to allow the inner ferrule to swivel within the female coupler about the ridge.

26. The method of claim 25, further comprising positioning an o-ring in a groove of the inner cavity of the female coupler to provide a seal between the outer ferrule, the inner ferrule, and the inner cavity of the female coupler.

* * * * *